United States Patent

[11] 3,612,036

| [72] | Inventor | Morris Kaufman |
| | | Morton Grove, Ill. |
| [21] | Appl. No. | 35,094 |
| [22] | Filed | May 6, 1970 |
| [45] | Patented | Oct. 12, 1971 |
| [73] | Assignee | Ekco Products, Inc. |
| | | Wheeling, Ill. |

[54] INSULATED BAKE PAN
16 Claims, 4 Drawing Figs.

[52] U.S. Cl.................................................. 126/390,
220/64, 99/172, 99/447
[51] Int. Cl...................................................... A47j 36/02
[50] Field of Search.......................................... 126/390,
373, 376; 220/64, 72; 99/172, 447

[56] References Cited
UNITED STATES PATENTS
| 140,527 | 7/1873 | Munson, Jr. | 220/72 X |
| 236,518 | 1/1881 | Vivarttas | 220/72 |
| 902,758 | 11/1908 | Nielsen | 220/64 UX |
| 968,761 | 8/1910 | Giesel | 126/390 UX |
| 1,522,329 | 1/1925 | Salucci | 126/390 X |
| 1,974,186 | 9/1934 | Kollman | 126/390 |
| 3,008,601 | 11/1961 | Cahne | 126/390 X |
| 3,202,542 | 8/1965 | Poje | 220/64 X |

FOREIGN PATENTS
| 810,738 | 1/1937 | France | 126/390 |

Primary Examiner—Frederick L. Matteson
Assistant Examiner—Robert A. Dua
Attorneys—Robert D. Teichert and Donald J. Koprowski ABSTRACT: A baking pan having sidewalls and end walls, has insulating inserts along the end walls and along a portion of the sidewalls near the end walls to prevent concentration of heat near the ends of the pan and to provide for slow and uniform heating of the product.

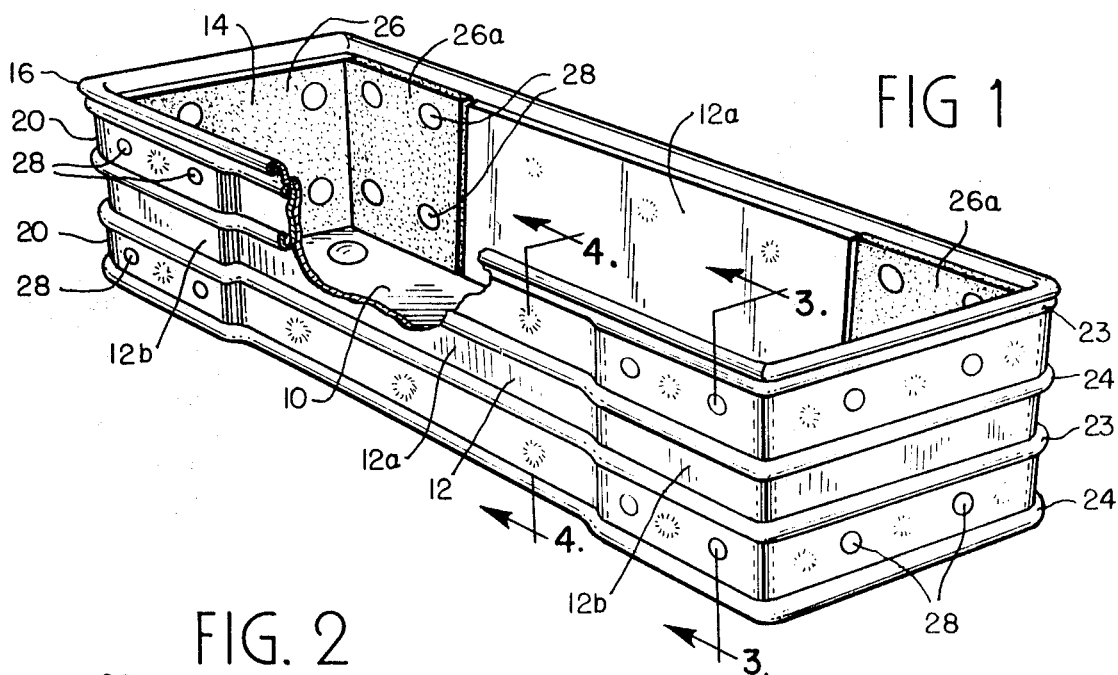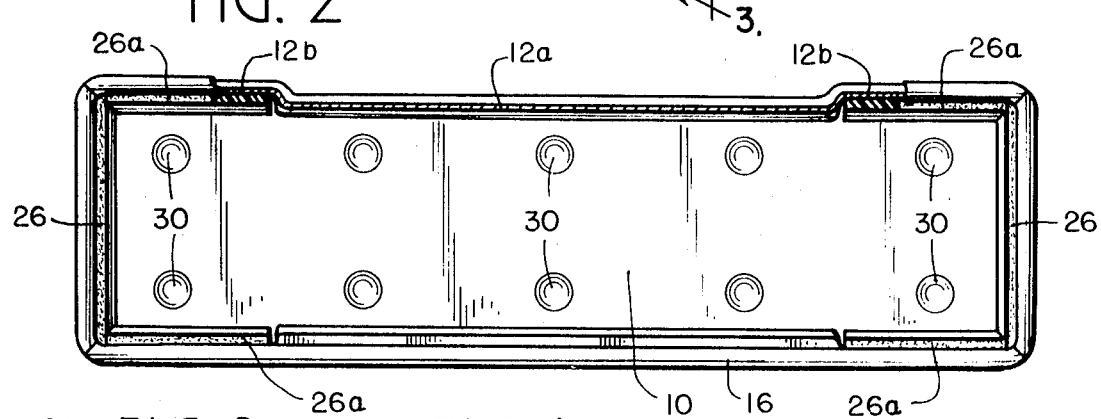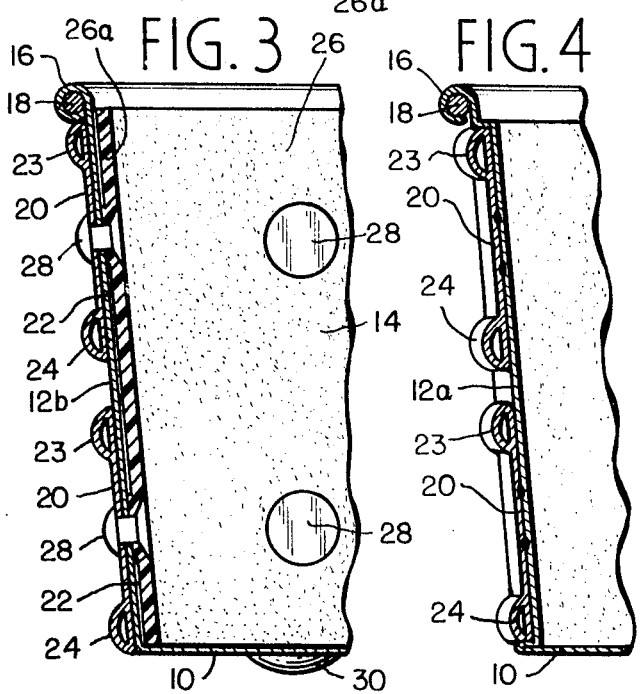

INSULATED BAKE PAN

BACKGROUND OF THE INVENTION

This invention relates to baking pans and more particularly to a baking pan having insulating inserts selectively placed to provide for slow and uniform heating of a product during the baking process.

In the production of bakery products it is often essential to bake same slowly and uniformly. This is especially true in the baking of dough that has a high-moisture content, such as a product commonly known as "pound cake." If the dough is heated too quickly, the moisture will be driven out prematurely and the dough will "set." This prevents the dough from "rising" to a desired height. On the other hand, if the dough is not heated uniformly throughout, some parts of it will rise to higher levels than others. Commonly, the dough will rise highest in the middle of the pan and will taper to a low point at the ends of the pan. This is due to the fact that a great portion of the heat supplied to the dough is absorbed from the walls of the pan. Near the end of the pan the dough absorbs heat from both the sidewalls and an end wall, whereas toward and at the middle of the pan, heat is absorbed from the sidewalls only. The resulting concentration of heat near and at the ends of the pan causes the dough in these locations to "set" more quickly than at other locations and thus prevents it from rising as high. As a result, when the finished product is sliced, pieces of uneven height are obtained.

The problem of providing a slow bake has been handled in several ways in the prior art, but no known pan exists which will provide the necessary insulation necessary for a slow bake while also providing for uniform heating and the resulting even raising of the dough. For example, pans completely lined with wood, or the common "pan-in-a-pan" construction having an air space for insulation have been utilized to insure a slow bake, but have not achieved the desired uniform heating.

Accordingly, it is an object of the invention to provide a baking pan having the necessary insulating characteristics to insure a slow bake while also providing uniform heating of the product.

SUMMARY OF THE INVENTION

This invention achieves the desired result by providing in a pan having sidewalls and end walls, insulating inserts along the end walls and along a portion of the sidewalls near the ends of the pan. This prevents the concentration of heat near the end walls. The sidewalls are preferably offset to accommodate the inserts so that the product will have an uninterrupted surface upon completion of the baking.

DESCRIPTION OF THE DRAWINGS

FIG. 1 is a perspective view of a bake pan of this invention.
FIG. 2 is a top plan view, partially cross sectioned, of the pan shown in FIG. 1.
FIG. 3 is a cross sectional view taken along line 3—3 of FIG. 1.
FIG. 4 is a cross sectional view taken along line 4—4 of FIG. 1.

DESCRIPTION OF THE PREFERRED EMBODIMENTS

A baking pan typifying the present invention, as shown in FIG. 1 of the drawings, includes a bottom wall 10 of substantially rectangular plan surrounded by upstanding sidewalls 12 and end walls 14. Within a flange 16 provided along the upper portion of the walls 12 and 14 may be placed a wire 18 which produces a continuous outstanding reinforcing or stiffening bead along the upper periphery of the pan. Preferably, completely surrounding the pan on the outside of sidewalls 12 is a reinforcing and insulating or heat-absorbing strap 20. To augment the reinforcing characteristics of strap 20, the upper edge of each strap is preferably rebent upon itself to define a hollow bead 23. The upper bead of the upper strap is preferably positioned in close underlying relation to the reinforcing bead along the upper edge of the pan. A similar bead 24 provided along the lower edge of each strap 20 also aids in adding rigidity to the pan.

In the preferred embodiment, in accordance with the invention, each sidewall 12 is comprised of a central panel 12a and end panels 12b. To provide the insulation necessary to prevent the concentration of heat near the ends of the pan, insulating inserts 26 and 26a are secured to the inside of the end walls 14 and to the end panels 12b of the sidewalls respectively. The central panel 12a of each sidewall is preferably offset inwardly in an amount substantially equal to the thickness of insert 26a so that an uninterrupted sidewall will result in the finished baked product. In order to achieve the most uniform heating, each of the inserts along the side walls 12b should be at least as long as one-third the length of the end wall 14 and should be no longer than end wall 14. When necessary, the inserts may be spaced apart slightly from the sidewalls 12 and end walls 14 to provide an air space 22, which adds to the insulating characteristics of the assembled pan.

The inserts 26 and 26a may be formed of a number of suitable materials and may be secured to the pan walls by any suitable fastening means. Best results are obtained by using an insert made of polytetrafluoroethylene (Teflon) secured in place on the inside of the walls 12b and 14 by means of rivets 28. While thickness of the Teflon is not critical, a range of from one-sixteenth to three-eighths inch are workable, with a thickness of one-eighth inch providing the best results. The Teflon inserts, while providing the necessary insulating characteristics, also are impervious to moisture, chemical reaction, heat and other deteriorating effects. Other materials having these desired characteristics may be employed, such as other fluorinated hydrocarbons, and silicone rubber, transite and marinite.

Depressions 30 may be formed in the bottom wall 10 of the pan which serve to elevate the pan slightly above the oven shelf during baking and prevent too rapid heat-up of the bottom of the baked product from heat conducted from the oven shelf through the bottom wall.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

I claim:
1. A rigid metal baking pan comprising a bottom wall of substantially rectangular plan surrounded by upstanding sidewalls and end walls, each of said sidewalls having a central portion disposed between two end portions, and an insulating insert secured to the inside of said pan along said end walls and only along said end portions of said sidewalls.
2. A baking pan according to claim 1 wherein each of said central portions of said sidewalls is offset inwardly of said end portions of said sidewalls in an amount substantially equal to the thickness of said insulating insert.
3. A baking pan according to claim 1 wherein the length of said insulating insert along each of said sidewalls is at least equal to one-third the length of said end wall.
4. A baking pan according to claim 2 wherein the length of said insulating insert along each of said sidewalls is at least equal to one-third the length of said end wall.
5. A baking pan according to claim 1 wherein said insulating insert is formed of a fluorinated hydrocarbon.
6. A baking pan according to claim 2 wherein said insulating insert is formed of a fluorinated hydrocarbon.
7. A baking pan according to claim 3, wherein said insulating insert is formed of a fluorinated hydrocarbon.
8. A baking pan according to claim 4 wherein said insulating insert is formed of a fluorinated hydrocarbon.
9. A baking pan according to claim 5 wherein said fluorinated hydrocarbon is polytetrafluoroethylene.
10. A baking pan according to claim 6 wherein said fluorinated hydrocarbon is polytetrafluoroethylene.

11. A baking pan according to claim 7 wherein said fluorinated hydrocarbon is polytetrafluoroethylene.

12. A baking pan according to claim 8 wherein said fluorinated hydrocarbon is polytetrafluoroethylene.

13. A baking pan according to claim 1 for baking products in an oven, including a reinforcing strap surrounding said pan on the outside of said sidewalls and said end walls.

14. A baking pan according to claim 4 for baking products in an oven, including a reinforcing strap surrounding said pan on the outside of said sidewalls and said end walls.

15. A baking pan according to claim 8 for baking products in an oven, including a reinforcing strap surrounding said pan on the outside of said sidewalls and said end walls.

16. A baking pan according to claim 12 for baking products in an oven, including a reinforcing strap surrounding said pan on the outside of said sidewalls and said end walls.